Patented Sept. 1, 1931

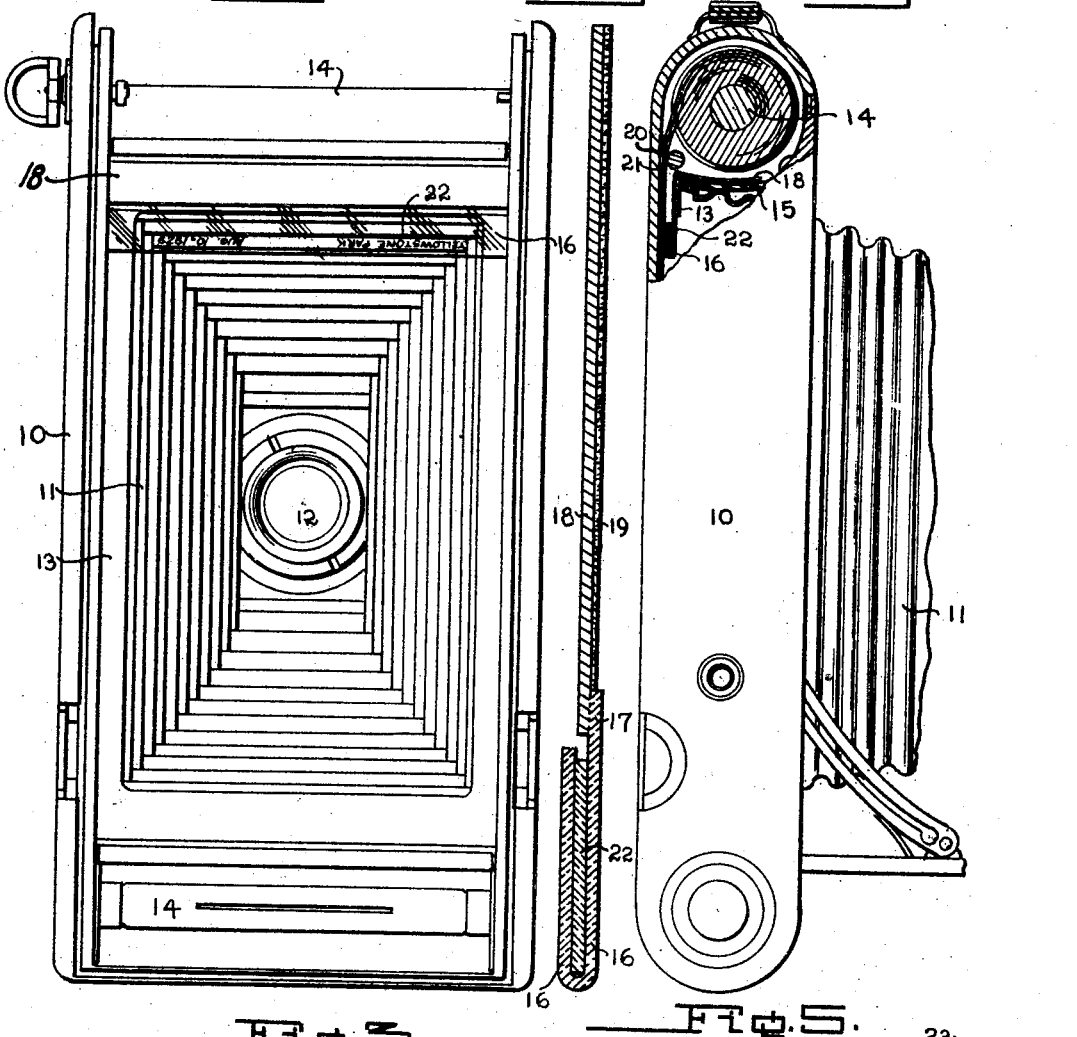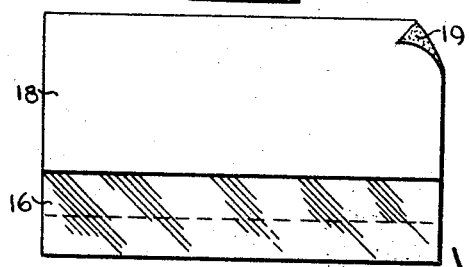

1,821,408

UNITED STATES PATENT OFFICE

JESSE A. SMURTHWAITE, OF HELENA, MONTANA

INSCRIPTION ATTACHMENT FOR CAMERAS

Application filed November 18, 1929. Serial No. 408,049.

The present invention relates to cameras, and has for an object to provide an attachment adapted to be mounted in the camera and to support autographs or other information which it may be desired to have as a permanent part of one negative or a series of negatives which have passed through the camera.

Another object of this invention is to provide an inscription attachment of this character which does not require any modification in the structure of the camera, and which may be readily applied to cameras of practically every construction.

Another object of the present invention is to provide a transparent carrier adapted to be permanently mounted in a camera and which is so constructed that it may be quickly and easily adapted to cameras of different sizes by the user and to provide removable or interchangeable transparent strips so constructed as to receive or carry the desired words, figures or an autograph so that the same may be suspended in the dark box of the camera in front of the sensitized element so that the characters upon the strips will be printed upon the sensitized element at the time of exposure and be thus permanently associated with the picture taken.

The invention also has for a further object the provision of a transparent pocket or envelope to receive a transparent strip bearing the desired character, and to provide the envelope with an adhesive coated attaching strip which is adapted to be secured to an inner part of the camera merely by moistening the strip so that the device may be quickly and easily applied.

The above, and various other objects and advantages of this invention will in part be understood from and in part be described in the following detailed description of the present preferred embodiment, the same being illustrated in the accompanying drawing, wherein:

Figure 1 is a rear elevation of a camera of usual form to which the invention is shown as applied, the back of the camera and the sensitized film strip being removed and the view looking into the interior of the dark box.

Figure 2 is a side elevation of the camera, partly in section showing the attachment applied thereto.

Figure 3 is a rear elevation of the attachment with one upper edge thereof curled backwardly to show the adhesive coating.

Figure 4 is an enlarged vertical section taken through the attachment, and

Figure 5 is a face view of a transparent sheet from which the printing strips for the attachment are cut.

Referring now to the drawing, the invention is shown as applied to one form of camera although it is understood from its construction that it may be applied to cameras of different forms and different sizes. In the present instance, 10 designates the frame or box of a camera which is provided with the usual bellows 11, lens 12 and border frame or mask 13 for the sensitized element and which is located immediately in back of the bellows 11 to seal the dark box of the camera against the sensitized element.

The frame 10 is provided in opposite ends with spools 14 for receiving the sensitized element in the usual manner, and as shown in Figure 2 the upper spool 14 is mounted in a well having the usual inner wall or partition 15 which is utilized in the present instance as a support for the attachment.

The attachment itself comprises a transparent pocket or envelope 16 which may be constructed of celluloid or other suitable transparent material and which preferably comprises a relatively broad strip which is overturned upon itself as shown to advantage in Figures 3 and 4 to provide a pocket or trough which opens upwardly. The rear side of the pocket 16 extends above the front side thereof so as to provide an attaching portion 17 which is secured by an adhesive or the like to an attaching strip 18 which may be of dark paper, cloth or the like. The strip 18 is of sufficient thickness and construction to support the transparent envelope or pocket 16 and is provided upon its rear side with a coating 19 of adhesive or the like by means of which the attachment may be quickly and easily applied to the camera.

The attachment, comprising the transparent pocket 16 and the attaching strip 18 may be cut at its ends in order to make it narrower for insertion in cameras of small width, and the attaching strip 18 may also be cut off if it is found too long to accommodate the strip 18 in the small size cameras.

In order to apply the attachment it is only necessary to remove the back plate 20 of the camera, moisten the adhesive coating 19 and then press the attaching strip 18 at its upper end portion over the partition 15 with the lower end of the attaching strip 18 hanging downward a slight distance, such as shown in Figure 2. In this position the transparent pocket 16 is suspended in position to be in line with the exposed portion of the sensitized film when the shutter of the camera is open so that light rays may pass through the pocket 16 and onto the sensitized film. In Figure 2 the film is shown as 21 and it will be seen that it traverses the side of the pocket 16 so that the pocket 16 remains in the same position while the film 21 is advanced to provide the necessary exposure surfaces and the pocket 16 is in the same relative position with respect to each exposed surface.

The pocket 16 is adapted to receive a transparent strip 22 which bears suitable characters thereon adapted to be registered on the sensitized film 21 at each exposure. The strip 22 is a portion of a transparent sheet 23, shown in Figure 5. This transparent sheet 23 is adapted to contain suitable data as to location, time and the like and is adapted to be printed up individually for each locality.

If the camera is used by a tourist traveling through Yellowstone Park and desires to take pictures and to record the dates the pictures are taken, it is only necessary to cut from the sheet 23 the line on which is printed "Yellowstone Park, August 1929" and to write in the exact day, if desired, such as 10. As shown in Figure 1, such a strip has been cut and so marked and has been slid into the envelope or pocket 16, the strip 22 being placed in the pocket 16 in a manner such that the characters or letters will be upside down, as shown. The film strip 21 and the back plate 20 are now placed upon the camera in the usual manner and the attachment is in position to make the desired impression upon the sensitized film at each exposure. It will be noted from Figure 5 that the sheet 23 may be printed with lines so spaced apart as to provide separate strips, one for each month in the year so that a dealer selling films in the particular locality may have a supply of these strips or sheets to furnish with the attachment, and each sheet supplies the necessary number of strips so that a strip for the particular month and year will always be available.

It is of course understood that the attachment is readily applicable to different types of cameras other than that shown and that it may be quickly and easily adjusted to different size cameras which are of less width than the full width attachment furnished by merely cutting off the necessary width of the part to be removed before the attachment is moistened and secured in place.

What is claimed is:

1. A printing attachment adapted for application to a camera in the dark box thereof comprising a transparent envelope, an attaching strip carried by the envelope and having an adhesive coating on its rear side adapted to be applied to an inner portion of the camera, and a removable strip of transparent material bearing characters detachably fitting in the envelope.

2. A printing attachment for cameras comprising a transparent envelope, attaching means carried by the envelope adapted for engagement with a part of the camera within the dark box thereof to suspend the transparent envelope horizontally across the front of the film, and a removable transparent strip mounted in the envelope and adapted to bear characters for imprinting upon the film when the latter is exposed.

3. A camera attachment comprising a sheet of transparent material returned upon itself to provide a pocket, and attaching means carried by the pocket for engagement with a camera to support the pocket in the dark box of the camera in line with the film.

4. A printing attachment for cameras comprising a transparent strip overturned lengthwise upon itself to provide a pocket, a flexible attaching strip secured to the pocket and comprising dark material and having an adhesive coating upon one side, said coating adapted to be moistened for securing the attaching strip to an inner part of the camera for holding the transparent pocket in the dark box of the camera in line with the film.

5. A printing attachment for cameras comprising a transparent envelope, an attaching strip secured to the envelope and having an adhesive coating on one side adapted to secure the attaching strip to the interior of the camera for holding the envelope in front of the film and in the dark box of the camera, and a sheet of transparent strips bearing suitable characters adapted for interchangeably fitting in the envelope for imprinting the characters upon the film.

6. A printing attachment for cameras comprising a transparent envelope, a transparent strip removably positioned in the envelope and bearing characters, and an adhesive attaching strip carried by the envelope adapted to be secured to an inner part of a camera for supporting the envelope with its strip in front of the film.

JESSE A. SMURTHWAITE.